United States Patent
Santelli, Jr.

(10) Patent No.: US 11,489,321 B2
(45) Date of Patent: Nov. 1, 2022

(54) WIRE MANAGEMENT SYSTEM WITH FLEXIBLE TAB

(71) Applicant: FRAM TRAK INDUSTRIES, Middlesex, NJ (US)

(72) Inventor: Albert Santelli, Jr., Martinsville, NJ (US)

(*) Notice: Subject to any disclaimer, the term of this patent is extended or adjusted under 35 U.S.C. 154(b) by 297 days.

(21) Appl. No.: 16/819,302

(22) Filed: Mar. 16, 2020

(65) Prior Publication Data

US 2020/0295547 A1 Sep. 17, 2020

Related U.S. Application Data

(60) Provisional application No. 62/818,795, filed on Mar. 15, 2019.

(51) Int. Cl.
*B65D 63/10* (2006.01)
*H02G 3/04* (2006.01)

(52) U.S. Cl.
CPC ........... *H02G 3/0437* (2013.01); *B65D 63/10* (2013.01); *H02G 3/0418* (2013.01)

(58) Field of Classification Search
CPC ..... H02G 3/0437; H02G 3/0418; B65D 63/10
USPC ........................................................ 174/480
See application file for complete search history.

(56) References Cited

U.S. PATENT DOCUMENTS

| | | | | |
|---|---|---|---|---|
| 4,454,374 A * | 6/1984 | Pollack | ................ | H02G 3/0431 174/117 A |
| 4,530,865 A * | 7/1985 | Sprenger | ................ | E04F 19/04 174/95 |
| 4,937,400 A * | 6/1990 | Williams | ............... | H02G 3/266 174/95 |
| 5,668,351 A * | 9/1997 | Hanlon | ............... | B60R 16/0215 174/72 A |
| 6,283,247 B1* | 9/2001 | McGrath | ................ | B44C 7/022 181/295 |
| 8,729,408 B2* | 5/2014 | Pawlak | ................... | E04F 19/04 248/68.1 |
| 2007/0138349 A1* | 6/2007 | Ayoub | ...................... | F16L 3/26 248/58 |
| 2007/0297743 A1* | 12/2007 | Rapp | .................... | H02G 3/0608 385/134 |

* cited by examiner

*Primary Examiner* — Timothy J Thompson
*Assistant Examiner* — Michael F McAllister
(74) *Attorney, Agent, or Firm* — Porzio Bromberg & Newman P.C.

(57) ABSTRACT

A wire management system including a cord cover. The cord cover includes a front wall coupled or integral with two side walls. A flexible entry tab is formed at an end of one of the side walls. An end of the other of the side walls is coupled or integral to a rear wall extending laterally from the side wall. The width of the rear wall can be less than the width of the front wall to form an opening between the rear wall and the opposed side wall. A cavity is formed between the front wall, side walls and rear wall. An adhesive material or adhesive strip is attached to an outer surface of the rear wall for attachment of the cord cover to a surface. The flexible tab can be flexed for inserting a cord or wire and automatically returns to the same plane as the side wall for providing a streamlined appearance of the cord cover.

16 Claims, 3 Drawing Sheets

WIRE MANAGEMENT SYSTEM WITH FLEXIBLE TAB

BACKGROUND OF THE INVENTION

Field of the Invention

The present invention relates in general to an electric wire holder for hiding a received wire and in particular to a wire management system including a flexible tab.

Description of Related Art

It is known that electrical the cords of domestic appliances such as clocks and lamps are unsightly and generally hang or run loosely from the appliances to the electrical outlets in a room. U.S. Pat. No. 4,454,374 describes an electric cord holder, which includes a sheath made of an elongated plastic extrusion having a slotted-tubular cross-section so as to define a cord-receiving channel therein. The sheath has a dome-shaped front wall having two ends and a planar rear wall joined to one end of the front wall and extending from the one end of the front wall towards the other end of the front wall. The rear wall has a free end leaving a slot adapted for insertion of an electrical cord into the cord-receiving channel between the free end of the rear wall and the other end of the front wall. The rear wall has an inner face which partially defines the cord-receiving channel and an outer face. The front wall has an overhang depending from the other end thereof which extends beyond the outer face and at least slightly toward the free end of the rear wall. The holder further includes securing means a connected to the outer face of the rear wall and adapted to be attached to an external surface, whereby the electric cord holder may be attached to the external surface with the overhang substantially abutting the external surface.

It is desirable to provide an improved wire management system including a cord cover having a flexible entry tab for ease of insertion and removing of a cord from within the cord cover.

SUMMARY OF THE INVENTION

The present invention relates to a wire management system including a cord cover. The cord cover can be formed of a rigid or semi-rigid material, such as for example rigid plastic. The cord cover includes a front wall coupled or integral with two side walls. A flexible entry tab is formed at an end of one of the side walls. An end of the other of the side walls is coupled or integral to a rear wall extending laterally from the side wall. The width of the rear wall can be less than the width of the front wall to form an opening between the rear wall and the opposed side wall. A cavity is formed between the front wall, side walls and rear wall. An adhesive material or adhesive strip is attached to an outer surface of the rear wall. An adhesive liner is placed over the adhesive material or adhesive strip.

During use, the adhesive liner is removed and the adhesive material or adhesive strip is applied to a surface over which a cord or cable is desired to extend. The surface can be a wall, ceiling or floor. The flexible entry tab can be flexed to allow the cord or cable to be inserted through the opening between the rear wall into the cavity of the cord cover. After insertion of the cord or cable, the flexible entry tab automatically returns to the same plane as the side wall of the cord cover. In this position, an end of the flexible entry tab is adjacent to the surface to which the cord cover is attached to provide a streamlined appearance of the attached cord cover. The cord or cable can be removed from the cavity upon flexing the flexible entry tab and removing the cord or cable from the cavity. The wire management system allows cords or cables to be expeditiously replaced after attachment of the wire management system to the surface.

The invention will be more fully described by reference to the following drawings.

DETAILED DESCRIPTION

Figure 1:
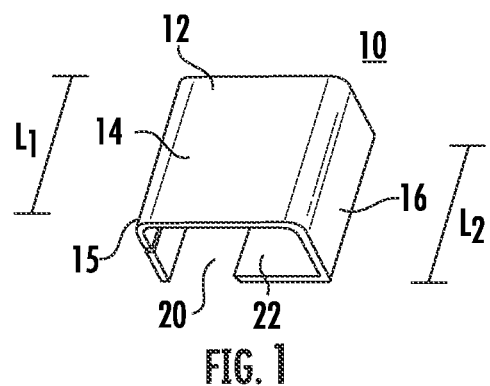
FIG. 1 is a perspective view of a wire management system including a cord cover.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a perspective view of wire management system 10. Cord cover 12 includes front wall 14 coupled or integral with side wall 15 and side wall 16. Side wall 15 and side wall 16 can extend rearwardly from front wall 14. In one embodiment, side wall 15 and side wall 16 can extend perpendicular to front wall 14. End 18 of side wall 15 is attached or integral with flexible entry tab 20. Side wall 15 is coupled or integral to flexible entry tab 20 along the length L1 of side wall 15.

Figure 2A:
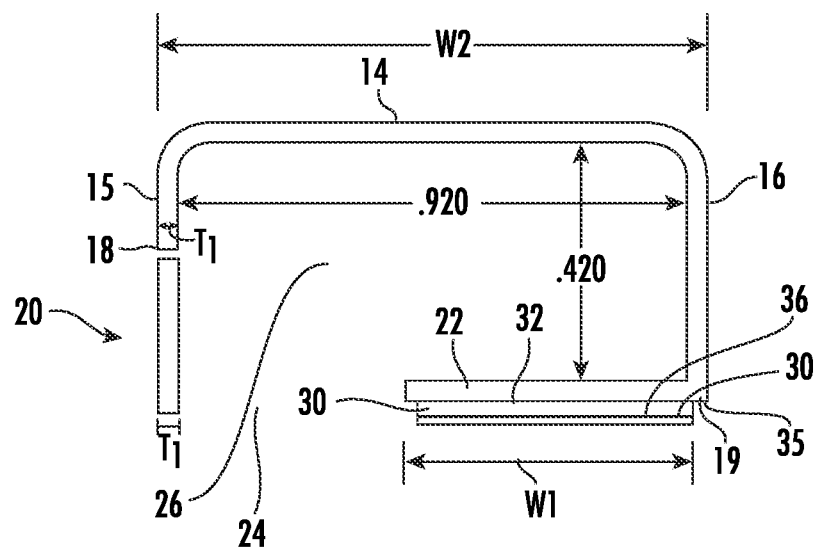
FIG. 2A is a front and top view of the wire management system.

Flexible entry tab 20 extends in the same plane from side wall 15 as shown in FIG. 2A. Flexible entry tab 20 can have the same or similar thickness Ti as side wall 15. End 19 of side wall 16 is coupled or integral to rear wall 22. Rear wall 22 can extend laterally from side wall 16. Rear wall 22 can be parallel to top wall 14. Side wall 16 is coupled or integral to rear wall 22 along the length L2 of side wall 16 as shown in FIG. 1. Width W1 of rear wall 22 can be less than width W2 of front wall 14 to form opening 24 between rear wall 22 and side wall 15 as shown in FIG. 2A. Cavity 26 is formed between front wall 14, side wall 15, side wall 16 and rear wall 22. Opening 24 extends into cavity 26.

Cord cover 12 can be formed of a rigid material or semi-rigid material. For example, cord cover 12 can be formed of a rigid or semi-rigid plastic. In one embodiment, cord cover 12 is formed of rigid or semi-rigid polyvinyl chloride (PVC). Flexible entry tab 20 can be formed of a flexible material. For example, flexible entry tab 20 can be formed of flexible PVC or urethane. In one embodiment, cord cover 12 and flexible entry tab 20 are co-extruded.

Adhesive material 30 is attached or coated on outer surface 32 of rear wall 22. Adhesive material 30 can be permanently attached to outer surface 32. Adhesive liner 35 is placed over adhesive material 30. Adhesive liner 35 is removably attached to side 31 or adhesive material 30.

Figure 2B:
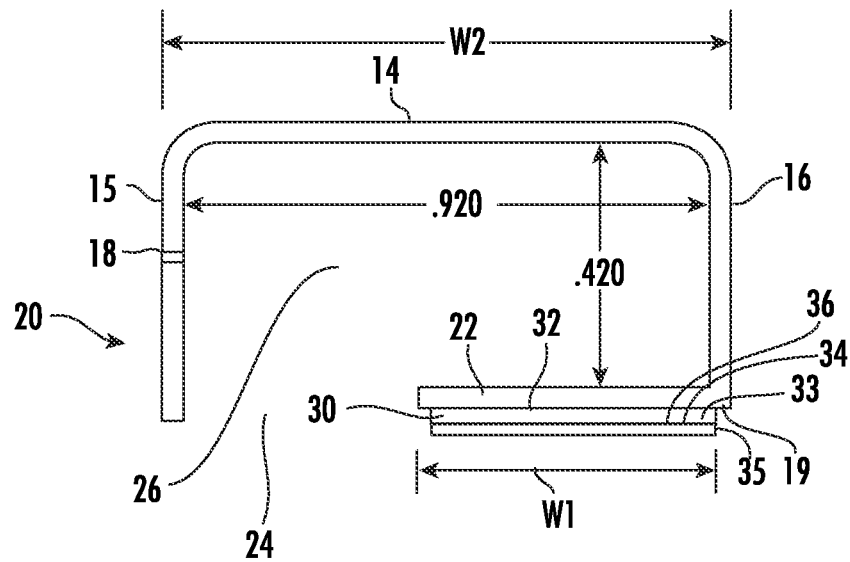
FIG. 2B is an end view of an embodiment of the wire management system.

In one embodiment, pressure sensitive adhesive strip 33 is attached to outer surface 32 of rear wall 22 as shown in FIG. 2B. Side 34 of pressure sensitive adhesive strip 33 is attached to outer surface 32 of rear wall 22. Side 34 or pressure sensitive adhesive strip 33 can be removably or permanently attached to outer surface 32. Adhesive liner 35 is placed over pressure sensitive adhesive strip 33. Adhesive liner 35 is removably attached to side 36 of pressure sensitive adhesive strip 33.

Figure 2C:
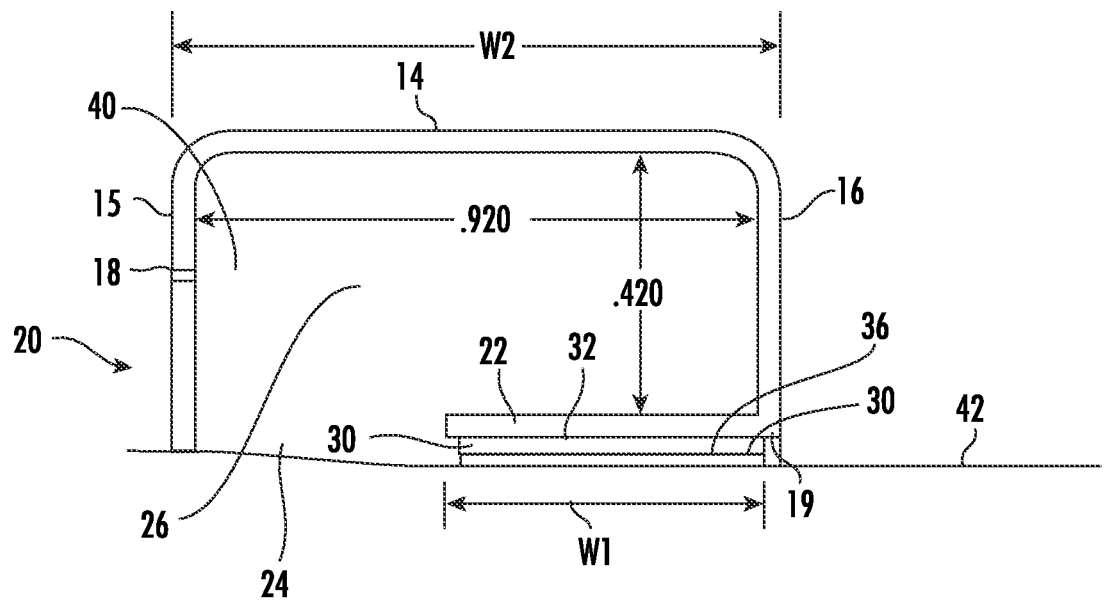
FIG. 2C is an end view of an embodiment of the wire management system.

During use, adhesive liner 35 is removed and side 36 of adhesive strip 33 is applied to surface 42 as shown in FIG. 2C. For example, surface 42 can be a wall, floor or ceiling. Flexible entry tab 20 can be flexed in the direction of arrow A1 to an open position to allow cord 40 to be inserted through opening 24 into cavity 26. Cord 40 can be retained within cavity 26. Once cord 40 is received in cavity 26, flexible tab 20 can automatically return to a closed position in which flexible tab 20 extends in the same plane with side 15. In the closed position, end 21 of flexible tab 20 is adjacent surface 42 to provide a streamline appearance of side 15 of cord cover 12. Cord cover 12 can have a low profile. Cord 40 can be removed from cavity 26 upon flexing flexible entry tab 20 and removing cord 40 from cavity 26. After removal of cord 40, side 36 can be removed from surface 42.

Figure 3A:
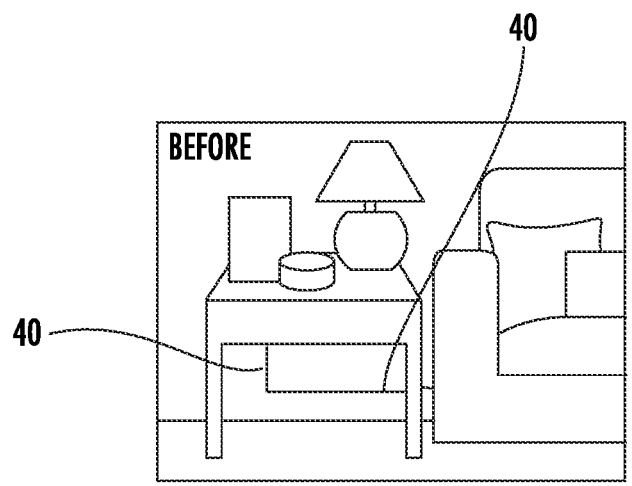
FIG. 3A is a schematic diagram of an arrangement of cords adjacent a surface before use of the wire management system.
Figure 3B:
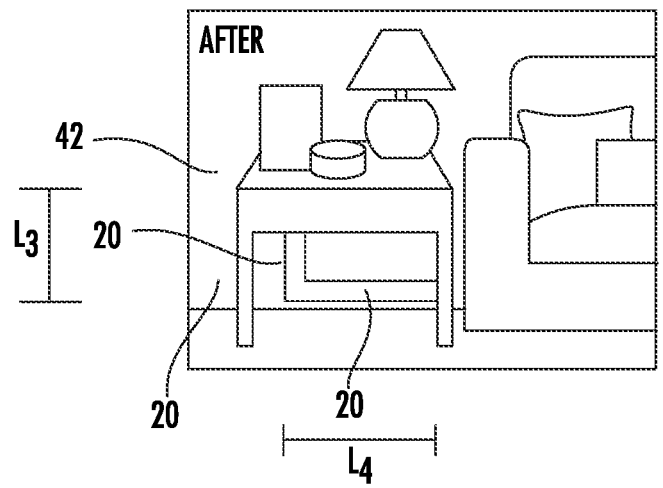
FIG. 3B is a schematic diagram of use of the wire management system with the arrangement of cords shown in FIG. 3A.

Cord cover 12 can be formed of various lengths. Kit 50 includes one or more cord covers 12. The one or more cord covers 12 can be formed in various lengths to be used to cover various arrangements of cords 40 as shown in FIG. 3A and FIG. 3B. In one embodiment, kit 50 includes cord cover 12a having a first predetermined length L3 and cord cover 12b having a second predetermined length L4. Length L3 can be the same or different than length L5. For example, cord 40 can be an electrical cord or a cable. Electronic products can include for example, computers, hard drives, printers, monitors, televisions, DVD players and the like.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A wire management system comprising:
a cord cover having a front wall, first side wall, second side wall and rear wall, a cavity formed between the front wall, the first side wall, the second side wall and the rear wall;
the first side wall and the second side wall extending from the front wall,
the rear wall extending laterally from the first side wall along the length of the side wall, a width of the rear wall is less than a width of the front wall to form an opening between the rear wall and the first side wall, the opening extending into the cavity, and
a flexible entry tab coupled or integral with the second side wall of the cord cover wherein the flexible tab is formed of a flexible material and the cord cover is formed of a rigid or semi-rigid material and
wherein the cord cover is adapted for receiving a cord by flexing the flexible tab to insert the cord through the opening into the cavity.

2. The wire management system of claim 1 wherein the front wall is integral with the first side wall and the second side wall.

3. The wire management system of claim 1, wherein the flexible tab is integral with the second side wall.

4. The wire management system of claim 1, wherein the rear wall is integral with the first side wall.

5. The wire management system of claim 1, wherein the flexible tab is formed of flexible polyvinyl chloride (PVC) or urethane.

6. The wire management system of claim 1, wherein the cord cover is formed of a rigid or semi-rigid polyvinyl chloride (PVC).

7. The wire management system of claim 1, wherein the cord cover and the flexible tab are co-extruded.

8. The wire management system of claim 1, wherein an adhesive material is attached or coated on an outer surface of the rear wall.

9. The wire management system of claim 1, wherein a first side of a pressure sensitive adhesive strip is attached to an outer surface of the rear wall and an adhesive lineris removably attached to a second side of the pressure sensitive adhesive strip.

10. The wire management system of claim 1, wherein the flexibletab extends in the same plane from the second wall.

11. A kit comprising: a plurality of cord covers, each of the cord covers having a front wall, first side wall, second side wall and rear wall, a cavity formed between the front wall, the first side wall, the second side wall and the rear wall; the first side wall and the second side wall extendingfrom the front wall, the rear wall extending laterallyfrom the first side wall along the length of the side wall, a width of the rear wall is lessthan a width of the front wall to form an opening between the rear wall and the first side wall, the opening extending into the cavity, and a flexible entrytab coupled or integral with the second side wall of the cord covers, wherein the flexible tab informed of a flexible material and the cord cover is formed of a rigid or simi-rigid material and; wherein each of the cord covers is adapted for receiving one or more cord by flexing the flexible tab to insert the cord through the opening into the cavity and each of the cord covers having a predetermined length.

12. The kit of claim 11, wherein the flexible tab is formed of flexible polyvinyl chloride (PVC) or urethane.

13. The kit of claim 11, wherein the cord cover is formed of a rigid or semi-rigid material.

14. The kit of claim 11, wherein the cord cover and the flexible tab are co-extruded.

15. The kit of claim 11, wherein a first side of an adhesive material or pressure sensitive adhesive strip is attached or coated on an outer surface of the rear wall of each of the cord covers and an adhesive linens removably attached to a second side of the pressure sensitive adhesive strip.

16. The kit of claim 11, wherein the flexible tab extends in the same plane from the second wall.

* * * * *